United States Patent
Bourderionnet et al.

(10) Patent No.: US 10,222,268 B2
(45) Date of Patent: Mar. 5, 2019

(54) METHOD FOR MEASURING RELATIVE DELAYS BETWEEN OPTICAL PROPAGATION CHANNELS IN PULSED OPERATION

(71) Applicant: THALES, Courbevoie (FR)

(72) Inventors: Jérome Bourderionnet, Sucy en Brie (FR); Arnaud Brignon, Bourg-la-Reine (FR); Marie Antier-Murgey, Antony (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/780,182

(22) PCT Filed: Nov. 30, 2016

(86) PCT No.: PCT/EP2016/079199
§ 371 (c)(1),
(2) Date: May 30, 2018

(87) PCT Pub. No.: WO2017/093277
PCT Pub. Date: Jun. 8, 2017

(65) Prior Publication Data
US 2018/0364106 A1    Dec. 20, 2018

(30) Foreign Application Priority Data

Dec. 2, 2015   (FR) .................. 15 02513

(51) Int. Cl.
*G01B 9/02*   (2006.01)
*G01J 9/02*   (2006.01)
(Continued)

(52) U.S. Cl.
CPC ............... *G01J 9/02* (2013.01); *G01J 11/00* (2013.01); *G04F 13/026* (2013.01); *H01S 3/0057* (2013.01); *H01S 3/2308* (2013.01)

(58) Field of Classification Search
CPC . G01J 9/02; G01J 11/00; G04F 13/026; H01S 3/0057; H01S 3/10; H01S 3/0085; H01S 3/2308
See application file for complete search history.

(56) References Cited

U.S. PATENT DOCUMENTS

| 2007/0086010 | A1* | 4/2007 | Rothenberg | B23K 26/0613 356/450 |
| 2008/0253417 | A1* | 10/2008 | Livingston | B23K 26/0613 372/38.02 |
| 2009/0134310 | A1* | 5/2009 | Goodno | H01S 3/2308 250/201.9 |

OTHER PUBLICATIONS

M. Antier-Murgey,"Measure interferometrique de phase et application a la combinaison coherente d'un grand nombre le fibres ampfificatrices," Nov. 17, 2014, XP055295722.
(Continued)

*Primary Examiner* — Tarifur R Chowdhury
(74) *Attorney, Agent, or Firm* — Baker & Hostetler LLP

(57) ABSTRACT

A method for measuring the delay between N pulses having a duration less than 100 picoseconds comprises the steps: collimated emission of the pulses having the same repetition frequency, emission of a reference pulse having the same repetition frequency capable of producing interference fringes with each of the pulses, for each of the pulses, detection, by a detector, of the coherent sum of this pulse with the reference pulse, this sum producing the interference fringes, the fringes originating from each of the pulses being distinguishable from one another. The reference pulse is emitted with an adjustable delay, and the method further comprises: for each delay, simultaneous measurement for the pulses of N contrasts of the interference fringes, for each of the pulses, a delay value between this pulse and the reference pulse is determined by the delay corresponding to the maximum contrast.

7 Claims, 4 Drawing Sheets

(51) Int. Cl.
H01S 3/00    (2006.01)
G04F 13/02   (2006.01)
G01J 11/00   (2006.01)
H01S 3/23    (2006.01)

(56) References Cited

OTHER PUBLICATIONS

L. Lombard et al., "Collective synchronization and phase locking of fs fiber amplifiers: Requirements and potential-solutions," European Physical Journal, vol. 224, No. 13, Oct. 26, 2015, pp. 2557-2566, XP035575127.
M. Antier et al., "kHz closed loop interferometric technique for coherent fiber beam combining," IEEE Journal of Selected Topics in Quantum Electronics, vol. 20, No. 5, Sep./Oct. 2014.
R. Trebino et al., "Using phase retrieval to measure the intensity and phase of ultrashort pulses: frequency-resolved optical gating," J. Opt. Soc. Am. A., vol. 10, No. 5, May 1993, pp. 1101-1111.
J. Bourderionnet et al., "Collective coherent phase combining of 64 fibers," Optics Express, vol. 19, No. 18, Aug. 29, 2011, pp. 17053-17058.
Daniault, et al., "XCAN—A coherent amplification network of femtosecond fiber chirped-pulse amplifiers", European Physical Journal, Special Topics, vol . 224, No. 13, pp. 2609-2613, Oct. 26, 2015 (Oct. 26, 2015), XP035575133.

* cited by examiner

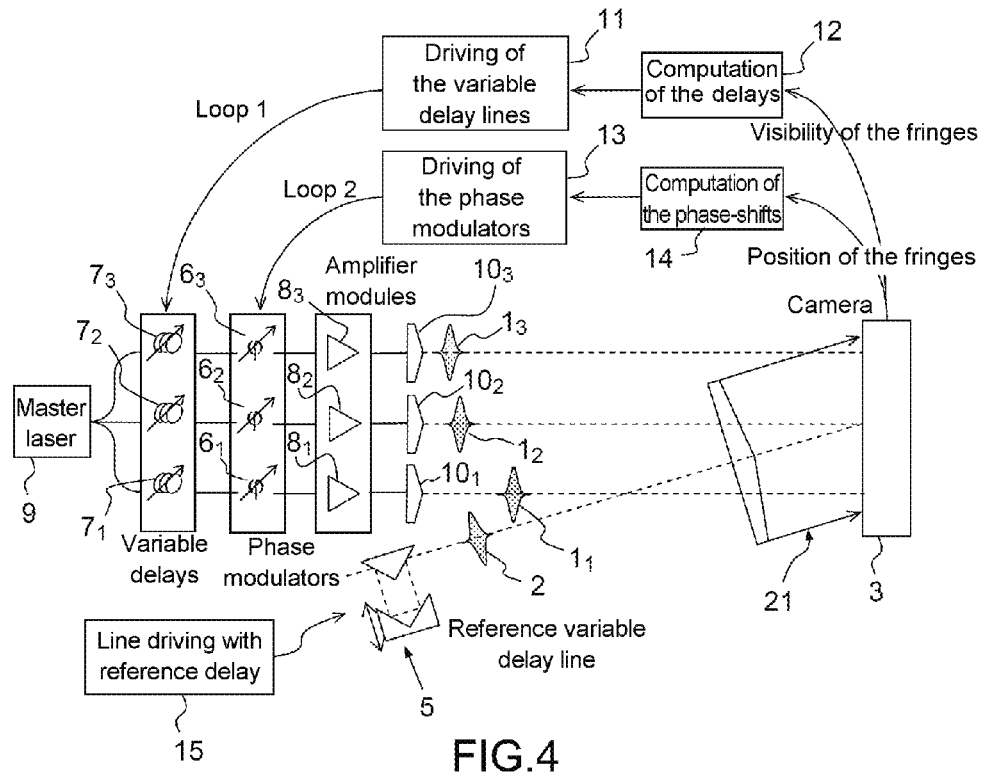
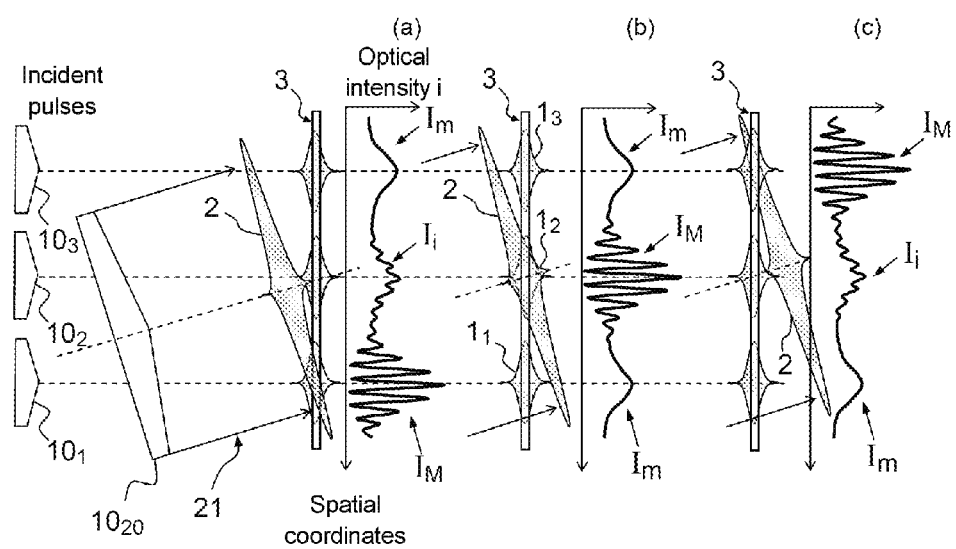
FIG.5a

METHOD FOR MEASURING RELATIVE DELAYS BETWEEN OPTICAL PROPAGATION CHANNELS IN PULSED OPERATION

CROSS-REFERENCE TO RELATED APPLICATIONS

This application is a National Stage of International patent application PCT/EP2016/079199, filed on Nov. 30, 2016, which claims priority to foreign French patent application No. FR 1502513, filed on Dec. 2, 2015, the disclosures of which are incorporated by reference in their entirety.

FIELD OF THE INVENTION

The obtaining of laser sources of high powers (or energies) and of great luminances is these days limited by the flux resistance of the gain materials. One solution to this problem is to distribute the amplification over several gain media in parallel then to recombine them.

The field of the invention is that of the coherent recombination of a large number of elementary laser sources of high power, and/or of high energy in the case of ultra-short pulse sources, for example having a pulse width less than 100 picoseconds.

BACKGROUND

Such a recombination of laser sources in pulse regime requires, compared to the continuous regime, the additional demand for the pulses to have to be not only in phase, but also synchronized. In other words, to interact, the pulses must be superposed spatially and temporally. That therefore demands knowledge of the propagation times of the pulses in each of the propagation channels of the system.

The fiber systems of coherently recombined amplifier networks (CAN systems, CAN being the acronym for "Coherent Amplifier Network"), typically comprising a multitude of fiber sections, for which it is difficult to control the length with an accuracy of less than 1 cm. The optical lengths of the different channels of the system therefore typically vary by a few cms, in other words an equivalent delay of a few tens to a few hundreds of picoseconds. These delays also vary dynamically, mainly with the heating up of the system, but also with the surrounding mechanical fluctuations. Now, to add 2 laser pulses coherently, these pulses must first of all have a maximum temporal overlap: they must be synchronized. Next, to have a maximum of intensity, the pulses must in phase or co-phased.

There are many phase measurement and co-phasing techniques described for example in the publication: "kHz closed loop interferometric technique for coherent fiber beam combining" by M. Antier et al, JSTQE 20(5). With respect to the issue of the synchronization of the pulses, the method used these days consists in manually adjusting the optical delay of each propagation channel by maximizing the nonlinear interaction signal between the pulses taken 2 by 2 in a device of FROG type as presented in the publication "using phase retrieval to measure the intensity and phase of ultrashort pulses: frequency-resolved optical gating" by R. Trebino et al, J. Opt. Soc. Am A 10. According to this device, one of the pulses passes through a variable delay line, and the propagation paths of the 2 pulses meet in a nonlinear crystal. The delay line is adjusted to maximize the signal generated by nonlinear interaction between the pulses. The value of the delay line then gives the delay between the pulses. This method makes it possible to effectively realign the relative delays of each pulse relative to the others, very reliably and accurately (to within a femtosecond), but it can not be implemented collectively for a large number of pulses, even a number greater than only a few tens.

The technical issue that is sought to be resolved is therefore how to measure these delays with a large number of channels, with implementation that is robust, reliable and inexpensive, this measurement being able to be implemented in a dynamic feedback loop. This measurement of the delays must moreover be compatible with the optical phase measurement and control architectures necessary to the phase-locking of the optical channels of the source.

The proposed invention consists in exploiting, in an original manner, collective architectures for measuring optical phase by inference with an external reference. The mapping of delays between the propagation channels of the system is then obtained by placing a variable delay line on the reference channel, then by scanning this delay while analyzing the interference figure produced on the detector. The presence of fringes with strong contrast indicates the synchronization of a pulse with the reference. In the case of spatial inference fringes, the spatial position on the detector makes it possible to identify the channel concerned, and in the case of temporal interference fringes, the frequency of the fringes makes it possible to identify the channel. The complete scanning of the delay over the reference ultimately gives the complete mapping of the system and makes it possible to synchronize all of the pulses by correcting the delay on each channel, by the measured value.

SUMMARY OF THE INVENTION

More specifically, the subject of the invention is a method for measuring the delay between N pulses having a duration less than 100 picoseconds being propagated in N channels, which comprises the following steps:
  collimated emission of these N pulses having the same repetition frequency,
  emission of a reference pulse having the same repetition frequency capable of producing interference fringes with each of the N pulses,
  for each of the N pulses, detection, by a detector, of the coherent sum of this pulse with the reference pulse, this sum producing said interference fringes, the interference fringes originating from each of the N pulses being distinguishable from one another, either spatially, or temporally.

It is mainly characterized in that the reference pulse is emitted with a delay relative to estimated times of arrival of the N pulses on the detector, this delay being adjustable over a determined range of delays, and in that the method further comprises the following steps:
  for a delay of the range of delays, simultaneous measurement, for the N pulses, of N contrasts of the interference fringes, this measurement being reiterated for P other delays of said range, so as to obtain P.N other interference fringe contrasts,
  for each of the N pulses, a delay value between this pulse and the reference pulse is determined by the delay corresponding to the maximum contrast out of the P contrasts.

The method according to the invention thus uses the visibility (or the contrast) of interference fringes as criterion of synchronization between the pulses, which has the advantage on the one hand of allowing for a collective implementation, and on the other hand of using the same diagnostic means as those used subsequently for the co-phasing of the pulses (locking of the position of the interference fringes).

According to a first mode of operation, the N pulses and the reference pulse have the same central wavelength (or pulsing), the direction of propagation of the N pulses is different from the direction of propagation of the reference pulse and the interference fringes are spatial interference fringes located in N distinct zones of the detector which is a matrix detector.

According to another mode of operation, the wavelengths of the N pulses are different to one another and different from the wavelength of the reference pulse, and the interference fringes are temporal interference fringes located at a same point of the detector.

Also a subject of the invention is a system for measuring the delay between N pulses having a duration of less than 100 picoseconds being propagated in N channels, which comprises:

N pulse sources configured for the N pulses to be propagated in parallel directions of propagation,
an emitter of a reference pulse configured for the reference pulse to be propagated in a direction of propagation that is inclined relative to the direction of propagation of the N pulses, and associated with an adjustable delay line, the N pulses and the reference pulse having the same wavelength and the same repetition frequency,
a matrix detector,
an imaging device configured to form, on the detector for each of the N pulses, a coherent sum of this pulse with the reference pulse, this sum producing spatial interference fringes.

The measurement system further comprises:
a device for straightening the direction of the wave plane of the reference pulse relative to the direction of propagation of the N pulses which comprises, on the path of the reference pulse:
a diffractive compensation optical element with periodic grating,
an optical setup with double Fourier transform and with predetermined enlargement, provided with two lenses and configured for the plane of the detector to contain the image focal point of the optical setup, and for the plane of the diffractive element to contain the object focal point,
means for implementing the measurement method described.

The invention relates also to a system for measuring the delay between N pulses having a duration less than 100 picoseconds being propagated in N channels, which comprises:

N pulse sources configured for the N pulses to be propagated in parallel directions of propagation,
an emitter of a reference pulse associated with an adjustable delay line, the N pulses and the reference pulse having the same repetition frequency, but different wavelengths,
a detector in photodiode form,
an imaging device configured to form, on the photodiode for each of the N pulses, a coherent sum of this pulse with the reference pulse, this sum producing temporal interference fringes,
characterized in that it comprises means for implementing the corresponding measurement method described.

Also a subject of the invention is a system for phase-locking and synchronizing N pulse sources having a duration less than 100 picoseconds which comprises:

N pulse sources having the same repetition frequency respectively provided with phase modulators,
an emitter of a reference pulse having the same repetition frequency, equipped with an adjustable delay line,
a detector,
an imaging device configured to form, on the detector for each of the N pulses, a coherent sum of this pulse with the reference pulse, this sum producing interference fringes,
a phase-lock loop which comprises:
means for computing phase-shifts between each source and the emitter of the reference pulse,
means for driving the phase modulators as a function of the phase-shifts, characterized in that it further comprises:
a variable delay line associated with each source,
a delay-lock loop which comprises:
a system for measuring the delay between the between N pulses as described,
means for driving the delay lines of the N sources as a function of the measured delays.

This system thus makes it possible to dynamically compensate the delays introduced over a large number N of laser beams by the propagation through a set of gain media (fiber amplifiers for example) connected in parallel. Once synchronized and phase-locked, the N emergent laser beams interfere constructively and thus constitute a source of luminance N times greater than that of an elementary amplifier, while keeping its beam quality (limited by diffraction in the case of single-mode fibers for example).

BRIEF DESCRIPTION OF THE DRAWINGS

Other features and advantages of the invention will become apparent on reading the following detailed description, given as a nonlimiting example and with reference to the attached drawings in which.

DETAILED DESCRIPTION

From one figure to another, the same elements are identified by the same references.

Hereinafter, in the description, the expressions "up", "down" are used with reference to the orientation of the figures described. In as much as the systems can be positioned according to other orientations, the directional terminology is indicated by way of illustration and is not limiting.

The solution provided takes as its basis the architecture of collective phase measurement by interferometric technique as described in the publication: "Collective coherent phase combining of 64 fibers" J. Bourderionnet et al, Opt Express. 19. In this architecture, the optical phase-shifts between the propagation channels are obtained by analysis of the networks of interference fringes between each of the optical beams with a common reference. The fringes are recorded collectively on a camera, such that all the phase-shifts are recorded in a single image. In pulsed regime, the pulses which are not synchronized, that is to say which are not present simultaneously in the plane of the sensor of the camera, will not produce interferences. The measurement is then impossible.

Figure 1:
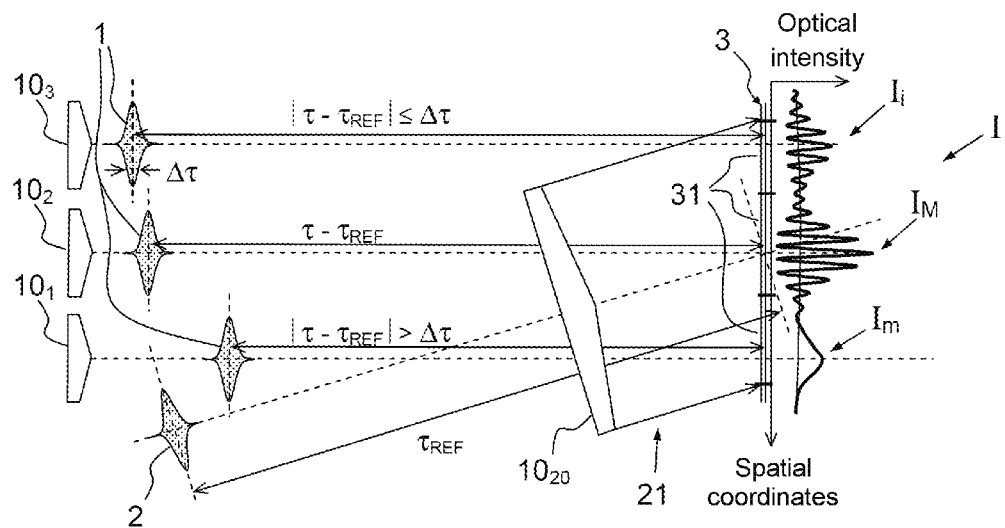
FIG. 1 schematically illustrates a step of the measurement method according to the invention, implemented in a configuration in which the reference beam is inclined relative to the beams to be characterized, FIG. 2 schematically illustrates several iterations of the step of FIG. 1 according to the invention, with the same configuration.

An exemplary implementation of the collective measurement method is described in relation to FIG. 1. The pulses 1 to be characterized are assumed collimated, and of the same direction of propagation; three pulses to be characterized are represented in the figure. A reference pulse 2 is extended into flat wave and is propagated in a direction not parallel to that of the pulses to be characterized. All the pulses 1 and 2 are assumed coherent (to be able to obtain interference fringes), and of the same repetition frequency (they are typically from the same master oscillator 9 shown in FIG. 4). The reference beam 21 spatially overlaps all of the beams to be characterized at the level of the detector 3 such as a measurement camera. The camera therefore records the sum of each pulse 1 with the reference pulse 2. This recording is spatially resolved, that is to say that each pulse to be characterized is assigned to a well-determined zone 31 of the camera: the pulses to be characterized do not spatially overlap.

Preferably, the optical density of the reference 2 is adjusted so as to be equal to the level of intensity of the pulses 1 to be characterized, so as to optimize the interference phenomena. When one of the pulses 1 to be characterized is perfectly synchronized with the reference pulse 2 ($\tau=T_{REF}$), the camera records an interference figure $I_M$ that is perfectly developed, that has a spatial period given by the angle between the directions of propagation of the reference beam and of the beams to be characterized. If the pulses do not overlap temporally ($|\tau-\tau_{REF}|>\Delta\tau$, with $\Delta\tau$ the temporal width of the pulses), then there is an incoherent summing $I_m$ and interference fringes are not observed. For the intermediate situations for which $|\tau-T_{REF}|\leq\Delta\tau$, interferences $I_i$ are observed but with a diminished contrast.

This measurement principle is applied to a set of N collimated pulsed laser beams, arranged according to a layout with 1 or 2 dimensions. The control camera 3 records an image I of this arrangement, such that each of the N beams corresponds to a spatial zone 31 distinct from the detector. According to the invention, a variable delay line 5 is placed on the reference pathway, itself also incident on the control camera 3, and forming an angle θ with the beams to be synchronized.

Figure 2:
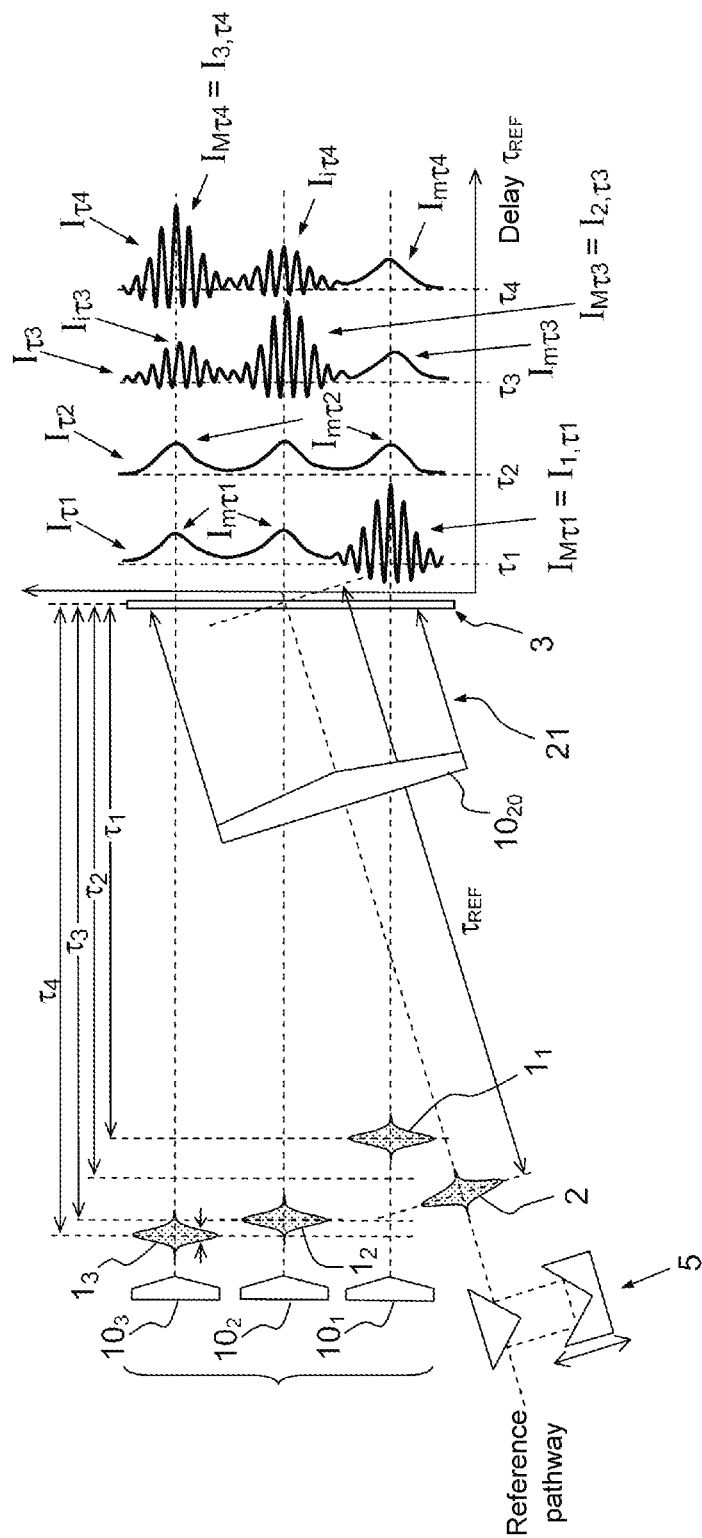

The mapping of the relative delays between the N laser beams is then obtained by scanning the travel of the delay line 5 of the reference pathway, and by simultaneously measuring the presence of interference fringes on the image of intensity I on the camera 3, as illustrated in FIG. 2. The travel of the variable delay line must be at the very least equal to the maximum delay to be probed; it varies within a predetermined range of delays, typically equal to 10 cm for pulses having a duration less than 100 picoseconds.

For each delay, a simultaneous recording I of the spatial superposition of the pulses is performed on the camera 3. The presence of interferences on the image of the camera indicates that a pulse 1 is synchronized with the reference 2, and the spatial position 31 of the set of fringes allows for the location and the identification of the synchronized propagation channel. By proceeding in this way until the interference fringes have been viewed for each of the channels, the measurement of all the relative delays of the system, that can then be compensated, is obtained.

At the end of this step, there is an image I$\tau$ per delay value $\tau$ ($\tau1, \tau2, \tau3, \tau4$ in the example of the figure) of the reference pathway, each image (I$\tau1$, I$\tau2$, I$\tau3$, I$\tau4$ in the example of the figure) containing the coherent addition (simultaneous pulses: $I_{M\tau1}$, $I_{M\tau3}$, $I_{M\tau4}$ in the example of the figure), or incoherent addition (pulses staggered temporally: $I_{m\tau1}$, $I_{m\tau2}$, $I_{m\tau3}$, $I_{m\tau4}$ in the example of the figure) of each incident pulse $1_1$, $1_2$, $1_3$ with the reference pulse 2. For the intermediate situations, interference fringes are observed with a diminished contrast ($I_{i\tau3}$, $I_{i\tau4}$ in the example of the figure).

The delay of the pulse 1 relative to the reference 2 is then given by the maximum of visibility of the interference fringes over all of the images I$\tau$ obtained in the scanning of the delay line 5 of the reference (I$\tau1$, I$\tau2$, I$\tau3$, I$\tau4$ in the example of the figure), that is to say by:
  the delay $\tau1$ for the pulse $1_1$,
  the delay $\tau3$ for the pulse $1_2$,
  the delay $\tau4$ for the pulse $1_3$.

The criterion of synchronization of the pulses, which corresponds to a maximum of visibility of the fringes, can then be obtained by different methods, more or less simple, and more or less robust. Each image $I_\tau$ is first of all considered as being subdivided into N images $I_{\tau,k}$ respectively centered on the N pulses $1_k$ to be characterized (k varies from 1 to N).

It is then for example possible to compute the maximum of intensity $I_m$ for each sub-image $I_{\tau,k}$. The lowest minimum value indicates the maximum of interference between the pulse $1_k$ and the reference 2, therefore an optimum synchronization. It is also possible to search for the maximum of intensity $I_M$ in addition to the minimum, which gives access to the contrast of the fringes.

Figure 3:
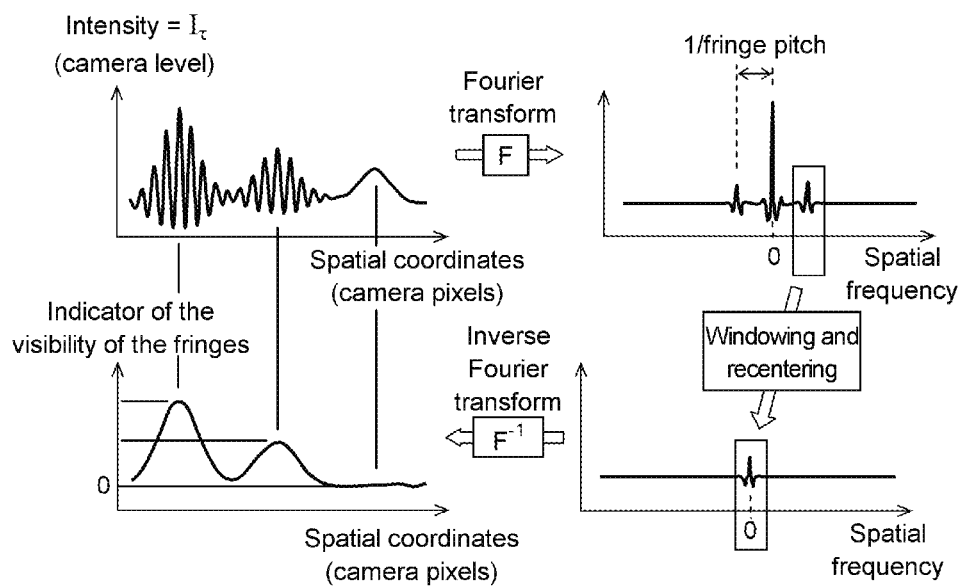
FIG. 3 shows different steps of an exemplary computation of the visibility of the fringes, FIG. 4 schematically represents an exemplary phase-lock and synchronization system according to the invention.

Another method, demanding more computation but with a better signal-to-noise ratio, is illustrated in FIG. 3. For each image $I_{\tau,k}$, the visibility of the fringes can be estimated by the power spectral density of the image at the frequency $v_0$ of the interference fringes. An image $I_\tau$ is processed as a whole by proceeding as follows:
  $\widetilde{\mathcal{H}}_\tau = \mathcal{F}(I_\tau)$ is computed, F being the Fourier transform,
  The contributions around the frequency of the interference fringes are isolated, and they are recentered around the zero frequency:

$$\widetilde{\mathcal{H}}_\tau([-\delta v;+\delta v]) = \widetilde{\mathcal{H}}_\tau([v_0-\delta v; v_0+\delta v])$$

$$v \notin [-\delta v;+\delta v]: \widetilde{\mathcal{H}}_\tau(v)=0$$

An image of visibility of the fringes is recovered by computing the inverse Fourier transform $F^{-1}$ of: $Y_\tau = F^{-1}(\widetilde{\mathcal{H}}_\tau)$ Ultimately, these various methods quantify the visibility $\widetilde{\mathcal{H}}$ of the fringes as a function of the delay $\tau$ of the reference 2, and for each pulse $1_k$ to be characterized. The delay $\tau_k$ of the pulse 1 indexed k relative to the reference is then given by the maximum of visibility of the interference fringes in the scanning of the delay line of the reference:

$$\tau_k = \max_\tau [Y(\tau, k)]$$

This mapping of delays ultimately makes it possible to adjust delay lines $7_k$ (shown in FIG. 4) present on each of the pathways k so as to equalize all the $\tau_k$.

The diagram of FIG. 4 illustrates an example of use of the invention in a complete chain of pulsed laser sources according to the coherent amplifier network (CAN) technology. According to this diagram, the master oscillator 9 is divided into N pathways (N=3 in the example of the figure). Each of these pathways comprises a means for adjusting the optical delay (such as an adjustable delay line $7_1$, $7_2$, $7_3$ driven by means 11 for driving the delay lines) for the synchronization of the pulses $1_1$, $1_2$, $1_3$, and a means for controlling the optical phase (such as a phase modulator $6_1$, $6_2$, $6_3$ driven by means 13 for driving phase modulators) for the co-phasing of the pulses $1_1$, $1_2$, $1_3$. Each channel is then amplified by an amplifier module $8_1$, $8_2$, $8_3$, before exiting into free space toward a collimation optic, typically a matrix of microlenses $10_1$, $10_2$, $10_3$. According to the diagram of FIG. 4, the diagnostic part of the system comprises a detector 3 such as a camera, on which the laser pulses $1_1$, $1_2$, $1_3$ are incident and a reference pathway, (with a collimation lens $10_{20}$), which includes also a variable delay line 5, of sufficiently great travel. A first locking loop is then defined by the following cycle:

The delay of the reference pathway 2 is varied for example by predetermined pitches of the order of the width of the pulses by means 15 for driving this delay line 5, and the mapping of the delays of the system is measured by means 12 for computing the delays, by exploiting the visibility of the interference fringes as described previously.

The delay lines of each pathway $7_1$, $7_2$, $7_3$ are adjusted (by the driving means 11 controlled by the computation means 12), so as to equalize the delays on each pathway and thus synchronize all the pulses $1_1$, $1_2$, $1_3$.

The means 15 for driving the delay line 5 of the emitter of the reference pulse are possibly themselves driven as a function of the measured delays.

This first loop can be implemented with a potentially very slow frequency, depending on the rate of drift of the delays of the system: every minute for example.

As described in the publication "Collective coherent phase combining of 64 fibers" J. Bourderionnet et al, Opt Express. 19, a second locking loop is then implemented to lock the optical phases of the pulses. When the first loop is closed, that is to say when the pulses are synchronized, this second loop uses the last camera image obtained at the end of the first locking loop with new images for the measurement of the mapping of the relative phases. The mapping of the phase-shifts of the system is measured by means 14 for computing phase-shifts, by this time exploiting the relative positions of the interference fringes, then the phase modulators $6_1$, $6_2$, $6_3$ are adjusted by the driving means 13 controlled by the computation means 14.

It has been indicated that the reference pulse 2 is propagated in a direction 8 forming a non-zero angle with the directions of propagation of the pulses 1 to be synchronized, and this is to be able to view interference fringes on the control camera. FIG. 5a shows a systematic error produced by the system as described above: for incident pulses $1_1$, $1_2$, $1_3$ that are perfectly synchronized, it can be seen that the maximum of contrast on the interference fringes $I_M$ is not obtained for one and the same delay value on the reference pathway (as would be the case for synchronized pulses):

in (a), there is the image I obtained when the bottom of the reference pulse 2 is in phase and synchronized with the pulse $1_1$ (but not with the pulses $1_2$ and $1_3$) in the focal plane of the camera 3, in (b), there is the image I obtained when the middle of the reference pulse 2 is in phase and synchronized with the pulse $1_2$ (but not with the pulses $1_1$ and $1_3$) in the focal plane of the camera 3, in (c), there is the image I obtained when the top of the reference pulse 2 is in phase and synchronized with the pulse $1_3$ (but not with the pulses $1_1$ and $1_2$) in the focal plane of the camera 3.

Figure 5B:
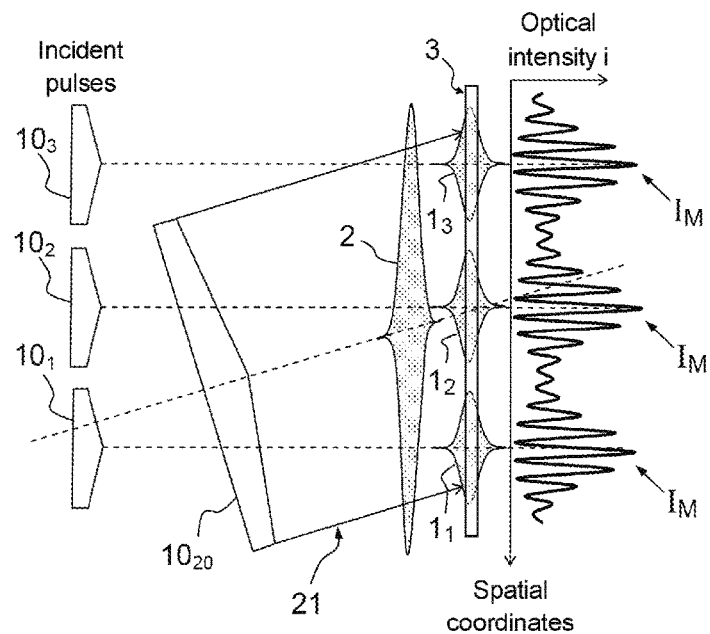
FIG. 5a illustrates a measurement error, and FIG. 5b the correction of this measurement error, FIG. 6 schematically represents an exemplary optical setup for straightening the reference pulse.

To overcome this problem, the angle $\theta$ between the directions of propagation of the pulses 1 to be synchronized and that of the reference pulse 2 must be obtained by keeping the propagation edges of the energy parallel, as illustrated in FIG. 5b. This condition can be produced by using a setup 100 for straightening the reference pulse 2 like that detailed in FIG. 6. A diffractive compensation optical element with periodic grating 101 is used to independently adjust the direction of propagation of the reference pulse 2 and the propagation edge of the energy (that is to say the spatial distribution of the energy of the pulse at a given instant). An optical imaging setup with double Fourier transform and with predetermined enlargement, provided with two lenses L1 and L2 and configured for the focal plane of the detector 3 to contain the image focal point of the setup and for the plane of the diffractive element 101 to contain the object focal point, then makes it possible to compensate the chromatic dispersion of the diffraction grating 101, such that the position of the interference fringes on the camera 3 is independent of the wavelength. More specifically, the diffractive straightening assembly 101 is imaged on the camera 3 by an imaging device. This imaging device comprises:

a lens L1 of focal length $f_1$ and a lens L2 of focal length $f_2$.

These two lenses form a setup with double Fourier transform of predetermined enlargement $\gamma$, capable of imaging the diffractive straightening optical assembly 101 on the camera 3: the diffractive straightening optical assembly 101 is situated in the object plane of the lens L1, the camera 3 being situated in the image plane of the lens L2, the image plane of the lens L1 coinciding with the object plane of the lens L2.

The optical beams from the pulsed laser sources $S_k$ are collimated upstream of the system (they are situated for example in a plane and collimated by a lens) and each beam forms, with the reference beam from L2, a specific angle $\theta$ on the camera 3. The angle $\theta$ is chosen to obtain an interference fringe pitch $\Lambda$ matched to the resolution of the camera (typically 1 fringe→~10 pixels). The diffractive straightening assembly 101 comprises a grating having a phase and/or periodic amplitude of pitch $\Lambda_{101}$. The pitch $\Lambda_{101}$ is computed as a function of the angle of incidence iv of the reference beam incident on the diffractive straightening optical assembly 101 and of the angle of inclination $\varphi$ of the diffractive straightening optical assembly on the axis z (optical axis of the lenses L2 and L1).

For the spatial distributions of energy of the pulses incident on the camera 3 to be parallel to the spatial distribution of energy of the reference beam, the angle of inclination (in the plane xOz) of the distribution of energy of the reference before the lens L2 has to be $\theta_2$. The imaging device composed of the lenses L1 and L2, having an enlargement $\gamma=-f_2/f_1$, then demands the following condition on the angle of inclination of the spatial distribution of energy (pi at the output of the diffractive straightening optical assembly 101:

$$\tan(\varphi_1) = \gamma \tan(\theta_2)$$

Also, it is considered that the diffractive straightening optical assembly 101 comprises a grating of uniform pitch $\Lambda_{101}$, and that its normal is inclined by an angle $\varphi$ relative to the optical axis of the imaging device composed of the lenses L1 and L2. $\psi$ is used to denote the angle between the direction of incidence of the reference source and the optical axis of the imaging device composed of the lenses L1 and L2. Finally, $\varphi_1$ denotes the angle at the output of the diffractive straightening optical assembly 101, between the spatial distribution of energy of the pulse and the propagation axis of the pulse. The angles $\varphi$, $\psi$ and $\varphi_1$ are linked by:

$$\tan(\varphi 1) = \frac{\sin(\psi - \varphi)}{\cos(\varphi)} + \tan(\varphi)$$

The optimization of the spatial overlap of the pulses at the diffractive optical straightening assembly involves:

$$\frac{\sin(\psi - \varphi)}{\cos(\varphi)} + \tan(\varphi) = \gamma \tan(\theta_2)$$

Which gives a first relationship between the parameters dimensioning the system:
the pitch of the fringes chosen at the camera level,
the central wavelength of the pulses $\lambda_0$,
the enlargement $\gamma$ of the imaging device.

Also, the pitch $\Lambda_{101}$ of the straightening grating 101 is established as a function of the direction of incidence $\psi$, of the direction of inclination of the grating, and of the wavelength $\lambda_0$ by:

$$\Lambda_{101} = \frac{\lambda_0}{\sin(\psi - \varphi) + \sin(\varphi)}$$

Figure 6:
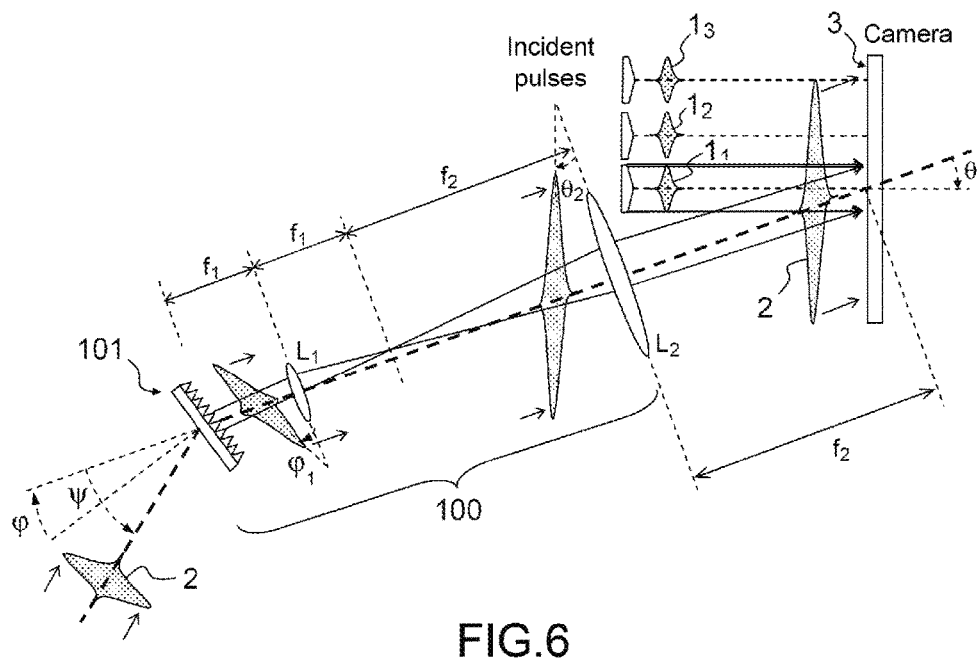

Ultimately, the optimization of the spatial overlap of the pulses at the level of the camera 3 is ensured by means of the system described in FIG. 6 if the following relationships between the parameters of the system are borne out:

$$\begin{cases} \frac{\sin(\psi - \varphi)}{\cos(\varphi)} + \tan(\varphi) = \gamma \tan(\theta_2) \\ \Lambda_{101} = \frac{\lambda_0}{\sin(\psi - \varphi) + \sin(\varphi)} \end{cases}$$

Or:

$$\begin{cases} \frac{\sin(\psi - \varphi)}{\cos(\varphi)} + \tan(\varphi) = \gamma \tan(\theta_2) \\ \Lambda_{101} = \frac{\lambda_0}{\gamma \tan(\theta_2) \cos(\varphi)} \end{cases}$$

The compensation of the chromatic dispersion of the diffractive straightening optical assembly 101 is now considered.

The pitch $\Lambda$ of the interference fringes at the level of the camera 3 depends on the wavelength $\lambda_0$ and on the angle $\theta_2$ between the reference and the pulses 1 at the level of the camera 3 according to:

$$\Lambda = \frac{\lambda_0}{\sin(\theta_2)}$$

With $\theta_2$ the angle of the reference beam at the central wavelength $\lambda_0$ with the pulses 1. A reference beam with a wavelength $\lambda_0 + \delta \lambda_0$ is considered. This beam forms an angle $\theta_2 + \delta \theta_2$ with the pulses 1. The condition of chromatic dispersion compensation demands that the pitch of the fringes $\Lambda$ be independent of the wavelength, i.e.:

$$\delta \theta_2 = \frac{\delta \lambda}{\lambda_0} \tan(\theta_2)$$

And therefore:

$$\frac{\partial \theta_2}{\partial \lambda} = \frac{\tan(\theta_2)}{\lambda_0}$$

Similarly, for the diffractive straightening optical assembly 101, it has been seen that the pitch of the compensation grating $\Lambda_{101}$ is established as a function of the direction of incidence $\psi$, of the direction of inclination of the grating, and of the wavelength $\lambda_0$ by:

$$\Lambda_{101} = \frac{\lambda_0}{\sin(\psi - \varphi) + \sin(\varphi)}$$

The computation of the angular deviation $\delta \psi$ between the wave vectors diffracted by the diffractive straightening optical assembly 101 at the wavelengths $\lambda_0$ and at $\lambda_0 + \delta \lambda_0$ gives:

$$\delta \psi = \frac{\delta \lambda}{\lambda_0} \left( \frac{\sin(\psi)}{\cos(\varphi)} + \tan(\varphi) \right)$$

The angular dispersion of the diffractive straightening optical assembly 101 therefore has the value:

$$\frac{\delta \psi}{\delta \lambda} = \frac{1}{\lambda_0} \left( \frac{\sin(\psi)}{\cos(\varphi)} + \tan(\varphi) \right)$$

The condition of chromatic compensation is deduced from the computation of the angular enlargement of the imaging device offset by transverse enlargement $\gamma$ like that of the system described in FIG. 6. The following condition is therefore obtained:

$$\frac{\delta \theta_2}{\delta \lambda} = \frac{1}{\gamma(1 + \tan^2(\theta_2))} \frac{\delta \psi}{\delta \lambda}$$

Ultimately, the compensation of the chromatic dispersion of the diffractive straightening optical assembly 101 is ensured by means of the device described in FIG. 6 if the following relationships are borne out:

$$\begin{cases} \Lambda_{101} = \dfrac{\lambda_0}{\sin(\psi - \varphi) + \sin(\varphi)} \\ \gamma\tan(\theta_2)(1 + \tan^2(\theta_2)) = \tan(\varphi) + \dfrac{\sin(\psi)}{\cos(\varphi)} \end{cases}$$

According to the conditions established in the preceding sections, the straightening of the reference pulse and the compensation of the chromatic dispersion of the diffractive straightening optical assembly 101 is ensured by means of the device described in FIG. 6 if the following relationships are borne out:

$$\Lambda_{101} = \dfrac{\lambda_0}{\sin(\psi - \varphi) + \sin(\varphi)}$$

$$\gamma\tan(\theta_2)(1 + \tan^2(\theta_2)) = \tan(\varphi) + \dfrac{\sin(\psi)}{\cos(\varphi)}$$

$$\dfrac{\sin(\psi - \varphi)}{\cos(\varphi)} + \tan(\varphi) = \gamma\tan(\theta_2)$$

Hitherto, it has been considered that the N pulses to be characterized and the reference pulse had the same central wavelength and that the direction of propagation of the reference pulse was different from that of the N pulses. Interference fringes are then obtained which are spatially distinguishable from one another: these are spatial interference fringes not located at the same point of the detector, which is typically a matrix detector.

The measurement method and the measurement and phase-locking and synchronization systems apply also to the case of N pulses $1_k$ having wavelengths that are different from one another and different from that of the reference pulse 2. They either have central wavelengths that are identical and phase-modulated with distinct and non-multiple frequencies $f_k$, or they are slightly offset from one another, by a deviation in wavelength $$\dfrac{\lambda_0^2}{c} f_k$$

with $\lambda_0$ the central wavelength of the reference pulse and c equal to $3.10^8$ m/s. The reference pulse is also either phase-modulated at the frequency $f_R$, or offset in wavelength by $$\dfrac{\lambda_0^2}{c} f_R.$$

The N pulses and the reference pulse for example have the same direction of propagation, and are focused by an imaging system at a same point of the detector where temporal interference fringes, or beating, are obtained at frequencies that are linear combinations of the $f_k$ and $f_R$. These temporal interference fringes, or beat products, are recorded by a detector 3 that is sufficiently fast in relation to difference in the wavelength between the pulses (sufficiently fast to detect the beats of each of the pulses with the reference pulse). This detector is typically a photodiode. The reference pulse straightening setup possibly becomes superfluous, because in this case, the pulses to be synchronized and the reference pulse can have the same direction of propagation (no need for an angle to reveal the spatial fringes) and therefore parallel energy propagation edges.

In the case of the use of a photodiode, the identification of the pulses is done by a frequency marking of the pulses. The mixing of the reference pulse 2 with the modulated or offset pulse $1_k$, produces temporal interference fringes at frequencies that are linear combinations of all the $f_0 \ldots f_N$ and $f_R$, including a component at the frequency $f_k$-$f_R$ specific to the pulse $1_k$. For each of the pulses $1_k$, k from 1 to N, a measurement of the contrast of the temporal fringes is then obtained by demodulation of the photodiode signal at the frequency $f_k$-$f_R$.

The means for computing the phase-shifts and the delays and the means for driving the phase modulators and the delay lines can in particular be implemented on the basis of a computer program product, this computer program comprising code instructions making it possible to perform the computation and driving steps. It is stored on a computer-readable medium linked to the detector 3. The medium can be electronic, magnetic, optical, electromagnetic or be a diffusing medium of infrared type. Such media are for example, semiconductor memories (Random Access Memory RAM, Read-Only Memory ROM), tapes, diskettes or magnetic or optical disks (Compact Disk -Read Only Memory (CD-ROM), Compact Disk-Read/Write (CD-R/W) and DVD).

Although the invention has been described in relation to particular embodiments, it is obvious that it is in no way limited thereto and that it includes all the technical equivalents of the means described as well as the combinations thereof provided they fall within the scope of the invention.

The invention claimed is:

1. A method for measuring the delay between N pulses having a duration less than 100 picoseconds being propagated in N channels, which comprises the following steps:
   collimated emission of these N pulses having the same repetition frequency,
   emission of a reference pulse having the same repetition frequency capable of producing interference fringes with each of the N pulses,
   for each of the N pulses, detection, by a detector, of the coherent sum of this pulse with the reference pulse, this sum producing said interference fringes, the interference fringes originating from each of the N pulses being distinguishable from one another,
   wherein the reference pulse is emitted with a delay relative to estimated times of arrival of the N pulses on the detector, this delay being adjustable over a determined range of delays, and wherein the method further comprises the following steps:
      for a delay of the range of delays, simultaneous measurement for the N pulses of N contrasts of the interference fringes, this measurement being reiterated for P other delays of said range, so as to obtain P×N other interference fringe contrasts,
      for each of the N pulses, a delay value between this pulse and the reference pulse is determined by the delay corresponding to the maximum contrast out of the P contrasts.

2. The method for measuring the delay between N pulses as claimed in claim 1, wherein the N pulses and the reference pulse have the same central wavelength, the direction of propagation of the N pulses is different from the direction of propagation of the reference pulse and wherein the interference fringes are spatial interference fringes located in N distinct zones of the detector.

3. The method for measuring the delay between N pulses as claimed in claim 1, wherein the central wavelengths of the N pulses are different to one another and different from the central wavelength of the reference pulse and wherein the interference fringes are temporal interference fringes located at a same point of the detector.

4. A system for measuring the delay between N pulses having a duration less than 100 picoseconds being propagated in N channels, which comprises:

N pulse sources configured for the N pulses to be propagated in parallel directions of propagation, an emitter of a reference pulse configured for the reference pulse to be propagated in a direction of propagation that is inclined relative to the direction of propagation of the N pulses, and associated with an adjustable delay line, the N pulses and the reference pulse having the same central wavelength and the same repetition frequency, a matrix detector, an imaging device configured to form, on the detector for each of the N pulses, a coherent sum of this pulse with the reference pulse, this sum producing spatial interference fringes, further comprising:

a device for straightening the direction of the wave plane of the reference pulse relative to the direction of propagation of the N pulses which comprises, on the path of the reference pulse:

a diffractive compensation optical element with periodic grating, an optical setup with double Fourier transform and with predetermined enlargement, provided with two lenses and configured for the plane of the detector to contain the image focal point of the optical setup, and for the plane of the diffractive element to contain the object focal point, means for implementing the measurement method as claimed in claim 1.

5. A system for measuring the delay between N pulses having a duration less than 100 picoseconds being propagated in N channels, which comprises:

N pulse sources configured for the N pulses to be propagated in parallel directions of propagation, an emitter of a reference pulse associated with an adjustable delay line, the N pulses and the reference pulse having the same repetition frequency, but different central wavelengths, a detector in photodiode form, an imaging device configured to form, on the photodiode for each of the N pulses, a coherent sum of this pulse with the reference pulse, this sum producing temporal interference fringes, comprising means for implementing the measurement method as claimed in claim 1.

6. A system for phase-locking and synchronizing N pulse sources having a duration less than 100 picoseconds which comprises:

N pulse sources having the same repetition frequency respectively provided with phase modulators, an emitter of a reference pulse having the same repetition frequency, equipped with an adjustable delay line, a detector, an imaging device configured to form, on the detector for each of the N pulses, a coherent sum of this pulse with the reference pulse, this sum producing interference fringes, a phase-lock loop which comprises:

means for computing phase-shifts between each source and the emitter of the reference pulse, means for driving the phase modulators as a function of the phase-shifts, further comprising:

a variable delay line associated with each source, a delay-lock loop which comprises:

a system for measuring the delay between the between N pulses as claimed in claim 4, means for driving the delay lines of the N sources as a function of the measured delays.

7. A computer program product, said computer program comprising code instructions making it possible to perform the steps of the method as claimed in claim 1, when said program is run on a computer.

* * * * *